United States Patent
Araki et al.

(10) Patent No.: US 11,573,913 B2
(45) Date of Patent: Feb. 7, 2023

(54) DEVICE PROXY AND CONTROL METHOD

(71) Applicants: ALAB INC., Tokyo (JP); KONAMI DIGITAL ENTERTAINMENT CO., LTD., Tokyo (JP)

(72) Inventors: Masayuki Araki, Tokyo (JP); Hajime Takahama, Tokyo (JP)

(73) Assignees: ALAB INC., Tokyo (JP); KONAMI DIGITAL ENTERTAINMENT CO., LTD., Tokyo (JP)

( * ) Notice: Subject to any disclaimer, the term of this patent is extended or adjusted under 35 U.S.C. 154(b) by 592 days.

(21) Appl. No.: 15/512,808

(22) PCT Filed: Aug. 31, 2015

(86) PCT No.: PCT/JP2015/074781
§ 371 (c)(1),
(2) Date: Aug. 1, 2017

(87) PCT Pub. No.: WO2016/043041
PCT Pub. Date: Mar. 24, 2016

(65) Prior Publication Data
US 2017/0351623 A1    Dec. 7, 2017

(30) Foreign Application Priority Data
Sep. 19, 2014   (JP) .............................. JP2014-191563

(51) Int. Cl.
*G06F 15/80* (2006.01)
*G06F 13/10* (2006.01)
(Continued)

(52) U.S. Cl.
CPC .............. *G06F 13/102* (2013.01); *G06F 9/48* (2013.01); *G06F 9/542* (2013.01); *G06F 2209/483* (2013.01)

(58) Field of Classification Search
CPC .......... G06F 13/102; G06F 9/48; G06F 9/542; G06F 2209/483
See application file for complete search history.

(56) References Cited

U.S. PATENT DOCUMENTS 9,003,432 B1 * 4/2015 Pellowski ........... G06F 11/3485
                                                                   719/321
9,195,518 B1 * 11/2015 Larsen .................... H04L 63/10
(Continued)

FOREIGN PATENT DOCUMENTS

| JP | H1011384 A | 1/1998 |
| JP | 2004070964 A | 3/2004 |

(Continued)

OTHER PUBLICATIONS

International Search Report for PCT Patent Application No. PCT/JP2015/074781, dated Nov. 17, 2015; 4 pages (3 pages of Official copy and 1 page of English Translation).

(Continued)

*Primary Examiner* — Andy Ho
*Assistant Examiner* — Abdou K Seye
(74) *Attorney, Agent, or Firm* — AEON Law, PLLC; Adam L. K. Philipp; David V. H. Cohen

(57) ABSTRACT

A device is provided with a multicore microprocessor unit (21) capable of inter-processor communication, storage (22) for storing a file describing device configuration information, and a device interface (23). Threads of the microprocessor unit are separated: a first processor core drives the OS, and meanwhile, a second processor core drives the device driver for controlling the device interface. While sharing the device configuration information by inter-processor communication, a notification driver interface for notifying the operating system kernel of configuration information on the basis of the device configuration information is loaded and the second processor core controls the device (Continued)

connected to the device interface by reading a scenario sequence file into the notification driver.

17 Claims, 7 Drawing Sheets

(51) Int. Cl.
    *G06F 9/48*     (2006.01)
    *G06F 9/54*     (2006.01)

(56) References Cited

U.S. PATENT DOCUMENTS

| | | | |
|---|---|---|---|
| 2004/0030415 A1 | 2/2004 | Lee | |
| 2004/0237086 A1* | 11/2004 | Sekiguchi | G06F 9/4843 718/100 |
| 2007/0260784 A1 | 11/2007 | Takamatsu et al. | |
| 2008/0005794 A1* | 1/2008 | Inoue | G06F 21/56 726/22 |
| 2008/0082975 A1* | 4/2008 | Oney | G06F 9/45558 718/1 |
| 2008/0172682 A1 | 7/2008 | Kyusojin et al. | |
| 2009/0193152 A1* | 7/2009 | Wang | G06F 13/102 710/8 |
| 2010/0318699 A1* | 12/2010 | Gao-Saari | G16H 40/40 710/72 |
| 2010/0325329 A1* | 12/2010 | Sakai | G06F 9/544 710/269 |
| 2011/0314050 A1* | 12/2011 | Matsubara | G06F 16/256 707/769 |
| 2012/0284712 A1* | 11/2012 | Nimmagadda | G06F 13/00 718/1 |

FOREIGN PATENT DOCUMENTS

| | | |
|---|---|---|
| JP | 2007257415 A | 10/2007 |
| JP | 2007265064 A | 10/2007 |
| JP | 2008192128 A | 8/2008 |
| JP | 2010181380 A | 8/2010 |
| JP | 2010181980 A | 8/2010 |

OTHER PUBLICATIONS

Notification of Reason(s) for Refusal for Japanese Patent Application No. 2016-514189 dated May 19, 2016; 7 pages (4 pages of Official copy and 3 page of English Translation).

\* cited by examiner

1

DEVICE PROXY AND CONTROL METHOD

TECHNICAL FIELD

The present invention relates to hardware (device-proxy) that relays freely-selected devices registered in the Operating System (OS) kernel.

BACKGROUND ART

In order to connect a computer, such as a personal computer or a smartphone, to peripheral equipment (hereinafter referred to as a "device") and use the device, not only a physical connection between the computer and the device, but also a "logical connection" between the computer and the device is required. With the "logical connection," a device-driver enables the computer to recognize the device and enables the computer and the device to communicate with each other.

The device-driver is typically produced by the device maker as a program exclusively for each combination of a device and an Operating System (OS) and is provided together with the device to users. Such a form of providing the device-driver is used mainly because each device is produced based on a specific standard and specification and additionally the device-driver depends on not only the device but also the OS.

CITATION LIST

Patent Literature

Patent Literature 1: Japanese Unexamined Patent Application Publication No. H10-011384
Patent Literature 2: Japanese Unexamined Patent Application Publication No. 2004-070964

SUMMARY OF INVENTION

Technical Problem

The device-driver may be a program to be designed based on a specific standard and specification for each device, and in short, it is a program for registering information concerning the device's hardware, such as parameters and connection forms, into an OS kernel. The information is necessary for constitution (configuration) or settings of the device. Most of the information contained in a device-driver concerns the device's hardware, while only some is specific to the OS. For example, an interface function (referred to hereinafter as "a driver-interface" in the description) between the OS and the device-driver is integrated into the OS kernel, and the kernel executes not only various program executed on the OS but also commands, data communications, or interruption processing via the driver-interface.

Consequently, after registering the device-driver into the kernel, resources of a computer may be occupied in order to control the connected device, and sometimes may cause instability in the OS operation.

The present invention is made in view of the foregoing, and an object of the present invention is to reduce processing load on a CPU driving the operating system.

Solution to Problem

A first device-proxy according to the embodiments of the present invention includes:
a multicore microprocessor unit having a first processor core and a second processor core, the multicore microprocessor unit being configured to separately execute execution threads on the first and second processor cores, and the multicore microprocessor unit being capable of inter-processor communication;
a storage means for storing a scenario sequence file where device configuration information is described; and
a device-interface, and
wherein:
the first processor core drives a first operating system and the second processor core drives a device-driver for controlling the device-interface,
the device configuration information is shared between the first and second processors by the inter-processor communication,
while the device configuration information is being shared between said first and second processors, a notification driver for notifying a kernel of the first operating system of the device configuration information is loaded, and the scenario sequence file is read into the notification driver, and
the second processor core controls a device connected to the device-interface.

As described above, one of the microprocessor cores in the multicore processor is assigned as an exclusive processor for controlling devices, and thus, control of the device can be removed from the OS management and the processing load on a CPU driving the operating system can be reduced.

A second device-proxy according to the embodiments of the present invention includes
a first processor;
a second processor;
a storage means for storing a scenario sequence file where device configuration information is described; and
a device-interface, and
wherein:
the first processor drives a first operating system and the second processor drives a device-driver for controlling the device-interface,
the second processor controls a device connected to the device-interface, and
while the first processor is driving the first operating system and the second processor is driving the device-driver:
the device configuration information is shared among the processors by bus connection,
a notification driver for notifying a kernel of the operating system of the device configuration information on basis of the device configuration information is loaded, and
the scenario sequence file is read into the notification driver.

A third device-proxy according to the embodiments of the present invention includes:
a first processor driving an operating system kernel;
a storage means for storing a scenario sequence file where device configuration information is described; and
a device-interface, and
wherein the device-proxy is connected to a computer via the device-interface, and
further comprising a third processor for controlling the device-interface, and wherein, while the device configuration information is shared via the device-interface, a notification driver for notifying the operating system kernel of the drive configuration information is loaded and the scenario sequence file is read into the notification driver and the third processor controls a device connected to the device-interface.

Such a configuration as described above enables the abstraction of the devices connected to the computer on the OS side and distributing CPU loads. It also enhances tamper resistance when the device includes some content because no information remains in the device-proxy.

Advantageous Effects of Invention

The device-proxy according to the embodiments of the present invention can reduce the processing load on the CPU driving the operating system.

DESCRIPTION OF EMBODIMENTS

Figure 1:
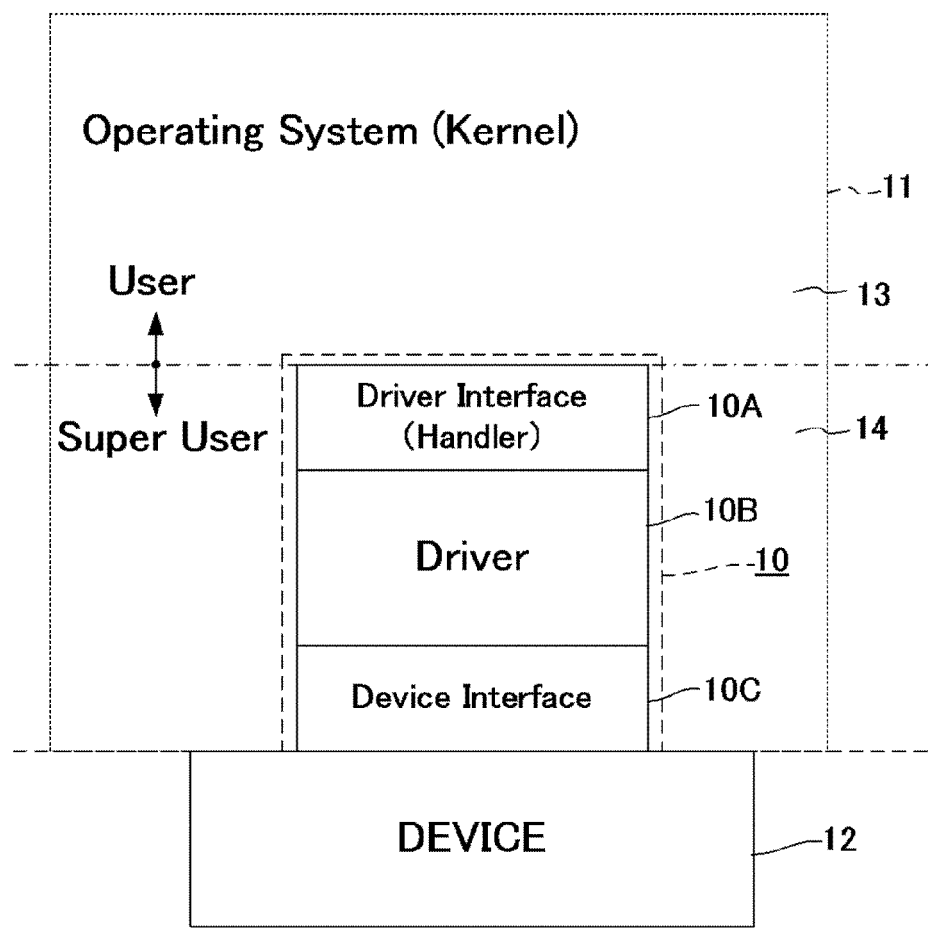
FIG. 1 is a schematic diagram showing a basic configuration of a device-driver.

Embodiments of the present invention will be described below with reference to drawings. The same or similar members are identified with the same symbols or the same symbols having different subscripts, their description is not repeated, the description of the embodiments should be interpreted in order to understand the technical ideas of the present invention, and the description of the embodiments should not be interpreted so as to be limited.

In accordance with various embodiments, in a computer with a multi-core processor, one or more cores of the multi-core processor may be configured to act as a "device-proxy" for controlling peripheral equipment ("devices"), while the remaining cores of the multi-core processor are configured for running an operating system ("OS") that acts as a platform for driving application programs (typically, Operating System (OS) including a human interface, such as Windows®, and Linux®, or the operating system mounted in a portable information terminal, such as various smartphones,). On the OS side, the computer appears to be connected to "device-proxy" hardware and the devices connected to the computer are abstracted. On the device side, the devices do not appear to be connected to the operating system kernel; rather, the devices appear to be physically connected to the "device-proxy" and logically transmit data to and receive data from the device-proxy, and the device-proxy relays data to/from the operating system kernel.

The minimum processing functionality required for the device-proxy is the minimum functionality of a device-driver required for operating the device and communication functionality for exchanging information required for the device's operation with the OS. Accordingly, if the behavior of the device-proxy is directly described in a primitive machine code, the device-proxy does not need to directly communicate with the operating system and is operable even with a processor having low processing capability (such as 16-bit microcomputer/20 MHz).

Therefore, this hardware is called a "device-proxy" in the sense of being logically interposed between the operating system kernel and devices and acting as a proxy for devices. As described in embodiments below, a device-proxy can be connected to a further device-proxy, and it can be configured as a "multistage proxy". This is because the first device-proxy acts as a "device" to the further device-proxy. If the multistage proxy is used, the proxy can be configured by using inexpensive microcomputers.

One embodiment for achieving the device-proxy provides a method to use a multicore processor unit. Recent versatile personal computers or servers often mount multicore processor units. At least one of the multicore processor units can be assigned to operate for the device-proxy. Specifically, at an early stage of a boot process of the operating system, a program called "boot loader" is started, and at that time, the role of operating the OS can be assigned to a processor (or a group of processors) of the multicore processor unit and the role of operating the device-proxy can be separately assigned to a different processor (or a group of processors).

As described above, since the processor required for operating the device-proxy does not need a high processing capability, a single-core may be sufficient. In some embodiments, a multicore processor may have a much higher processing capability than a single-core has, and for ease of the environment construction, an embedded operating systems (called "Real time Operating System") was used in the experimental stage.

The device-proxy operates independently from the OS, and the OS-user is not usually conscious of presence of the device-proxy. However, since the multicore microprocessor unit usually includes a mechanism for communicating between multicore processors (Inter-Processor Communication (IPC)), the processors can exchange data each other. When the CPUs are physically separated, the processors can exchange data each other via the device-interface.

While making use of this mechanism, the configuration information required for the device operation can be shared, or the device configuration information, etc. of the device-proxy or the device connected over the device-proxy can be transmitted to the OS kernel (for example, the configuration information corresponding to the device, received via a human interface, can be transmitted).

An OS may not necessarily be mounted on the device-proxy, for example if the device-proxies are connected in multiple stages, or the device connected includes sensitive information and thus tamper-proofing is desired to be enhanced.

As described above, the microprocessor unit that is one of multicore processors is assigned as an exclusive processor for controlling devices, and thus, the device control can be removed from the OS management. In one example, a network card device connected to Ethernet® (1 Gbit/s) may transmit one billion interruption processing signals per second to the operating system kernel, however if the network card device is connected via the device-proxy, the device-proxy processes all this behavior. Thus, the device-proxy can reduce a processing load on the CPU driving the operating system.

The multicore processor can execute a plurality of threads. If a dual-core processor is used the operation speed of dual-core processor would be twice as fast as that of a single-core processor, but if a quad-core processor is used the operation speed of a quad-core processor would be four times or less as fast as that of a single-core processor. Even if the number of the cores is increased more, the operation speed is not increased proportionally to the number of the cores. Additionally, one of the processors available for operating the OS is removed and allocated to the task of device management. Then, on the OS side, the device is abstracted as if one device for communicating TCP-IP protocol packets is connected via an abstract Ethernet® but not via a concrete Gigabit network card. Consequently, it leads to reduction of a processing load on the CPU as a whole.

As described above, the device-proxy presents itself is a sort of device to the OS, but a target device, which the OS eventually controls, can be connected over the device-proxy and/or over a device connected to the device-proxy(s). Since the device is controlled using a "device-driver," which is a program for communicating information, such as the device configuration information, and the connection path, with the operating system kernel, all or part of the device configuration information also requires to be provided to the device-proxy. Such information can be shared in inter-processor communication, via a bus connection, or via a device-interface.

A "device-driver" according to the embodiments of the present invention is described below. Additionally, the device configuration information described below shall contain configuration information of a device, which the OS eventually controls and is connected over the device-proxy.

(First Embodiment)—Basic Configuration of Device-Driver

FIG. 1 is a schematic diagram showing a basic configuration of a device-driver 10. The device-driver 10 is a program situated between an OS kernel 11 and a device 12, and the basic configuration includes three following parts:

(a) driver-interface 10A;
(b) device-driver body 10B; and
(c) device-interface 10C.

Although there are quite a wide variety of devices, a device-driver for any such device basically has the configuration shown in FIG. 1. An area on the further side of the driver-interface 10A (seen from the device 12) is an area operable by users (a user area 13), and the other area on the near side of the driver-interface 10A (seen from the device 12) is an area operated with administrator rights (an administrator area 14).

For the conventional device-drivers, all of (a) to (c) may be produced as one program by device makers and delivered to users, but the device-driver according to the embodiments employs a configuration that separates the device-driver into a program that conducts functions of driver-interface 10A and a file where the device configuration information required for the operation of device-driver body 10B and device-interface 10C is described.

(a) Driver-Interface

Although the driver-interface is an interface situated on the border between the OS and the device-driver and it is basically different for each OS, each function is the same and not OS-dependent. Examples of main features (functions) of the driver-interface are followings.

1. Initialization (initialize the device)
 2. Open (open the device)
 3. Close (close the device)
 4. Read (read commands or data from the device)
 5. Write (write commands or data into the device)
 6. I/O Control (control non-standardized devices)

A device handler (hereinafter referred to as "a handler") functions as an interface between the device and the kernel. The handler is one of the programs deployed on a computer memory that the kernel manages. The handler is a subroutine program that is usually in a standby state but that is called when a specified processing request (event or interrupt) is generated. For registering driver configuration information into the kernel, the various types of device configuration information, which the device-driver 10B holds, is provided to the kernel using this handler.

Although the driver-interface 10A is OS-dependent, once the driver-interface 10A is created for implementing the device-driver corresponding to a certain OS, the driver-interface 10A will remain the same as long as the processor, which operates the OS and the kernel, is not changed. On the other hand, since both of the device-driver body 10B and device-interface 10C described below are device-configuration-dependent, they are common regardless of the OS if the device or the connection method (interface with the device) is the same. Compared with the entire device-driver 10, the driver-interface 10A is only a small part of device-driver 10.

(b) Device-Interface

The device-interface is an interface with devices for the OS kernel, and includes two types of interfaces (physical interface and logical interface (logical packet interface)). The physical interface is a portion of the device-interface for handling a physical connection form (connection problem) with hardware. With the physical interface, registers of the device to be registered are deployed on a memory map of the kernel. The physical interface is provided with a bus connection to handle memory sharing and interruption processing, and, examples of physical interfaces for communication include a memory mapped register (PCI bus connection), and communication-type register (I2C (Inter-Integrated Circuit) bus interface or SPI (Serial Peripheral Interface), etc.) bus interface, depending on the connection form of the device.

On the other hand, the logical interface is an interface that represents and controls the behavior of the device via the batch data (protocol packet data) according to a predetermined protocol, such as string of letters, and binary streams. "Device-interface" means one or both of the physical interface and the logical interface, depending on the context.

The device-interface also includes interruption lines for transmitting and receiving interruption signals. The interruption processing has a role of controlling condition changes of the device, using a registration type handler. If the device is a camera module as an example, a "pressing down a shutter" event is handled with the interruption processing. When the shutter is pressed down, an interruption handler is called from the kernel and consequently the corresponding function (subroutine) is read in.

(c) Device-Driver Body

The device-driver body 10B according to the embodiments mainly includes the following configuration information.

1. Configuration information for controlling devices
2. Configuration information to be set to devices (parameters, etc. to be given to devices)

"Device configuration information" in the description includes both of the above mentioned "1. Configuration information for controlling devices" and "2. Configuration information to be set to devices". The configuration information includes not only data but also commands. Examples of such commands (instructions) that can be described in script include interruption waiting, substitution to registers, instruction of DMA transfer, communication via I2C/SPI bus, and write or read into/from memory mapped register.

"Control of the device" means a control relating to basic behaviors of the device, and includes the control executed with administrator rights, such as resetting of device and changing device settings. Additionally, the parameters to be set to the device are parameters for controlling depending on use purpose or use condition of the device, and the parameters are set by users. Examples of behaviors controlled by the parameters include changing a printer paper source and setting the mode of a camera (for example, switching a panorama mode, a moving picture mode, or a still picture mode depending on the occasion, with the same sensor and lens), with the same connection form and printer. Some device behaviors controlled by the parameters cannot be detected electrically at all by the device (except special cases). Since the device-driver body is essentially device-dependent, the device, the device-driver body is determined based on the information provided from the device maker.

As described above, the device-driver body, which is the core of the device-driver, holds various device-specific configuration information, such as various parameters of the device, and commands to driver-interface 10A or device-interface 10C. This content of the device-driver body depends in large part on the device (hardware), but hardly depends on the OS. However, the conventional device-driver is OS-dependent as a whole, because even though the most part of the configuration of the conventional device-driver is determined depending on the device or the connection form, some part of the configuration is OS-dependent.

On the other hand, the device-driver according to the embodiments is configured:

to provide one "notification driver," which functions only as "(a) driver-interface" (OS-dependent), per OS, and to start first loading the notification driver into the kernel, and then reading the device configuration information not depending on the OS (but depending on the device) into the kernel via the "notification driver" during initialization of the device. It permits the user to freely rewrite the device configuration information with user-rights after the device-driver has been produced.

As described above, the sequence of the features (sequence of the registers) is determined before the main thread, by reading the device configuration information during the initialization of the device. This is because it takes time to intend to determine the sequence during runtime. Since the behavior caused by writing into the register depends on the manufacturer, the behavior often differs, but the needs of users are the same and the functionality implemented is usually about the same even though the sequences of the registers are different.

Examples of camera modules are as follows:
Camera A
Register #1. Zoom
Register #2. Focus
Camera B
Register #1. Focus
Register #2. Zoom Even if the sequences of the registers differ as described above, the sequences of the registers can be simply changed by altering the parameter defined according to the device setting-information, and it enables Camera A and Camera B to implement the same functionality.

The device-driver according to the embodiments of the present invention can be registered by loading "notification driver for the device configuration information," which is for not a specific device but rather generic devices, into the kernel, by reading the device configuration information into the notification driver during the initialization of the device, and by notifying the kernel of the device configuration information via the notification driver.

The notification driver may, for example, be written (programmed) in C, etc., and once the notification driver has been written, the same notification driver can be used repeatedly as long as the OS and processor unit remain the same.

According to the embodiments of the present invention, the device configuration information is described in a script format file called "scenario sequence file". When the notification driver is loaded and the device is initialized, the scenario sequence file where the device configuration information is described, such as "microphone device that communicates music information via I2C interface," is read and it enables OS users to recognize that the device is a microphone device. This scenario sequence file depends on the device, but does not depend on the OS.

Consequently, even if required function is dispatched each time the device is initialized, the memory amounts occupied when the device configuration information is registered in the kernel are the same as the memory amounts occupied by the conventional device driver. Regarding this point, the device driver according to the embodiments of the present invention has no disadvantage compared with the conventional device driver.

The conventional device driver generally does not require the read processing of the scenario sequence file, and thus, it can be an additional processing. However, since recent personal computer or smartphone, etc. includes a microprocessor unit whose processing capability is high and an enough memory available, the processing (registration in the kernel) can be completed within the time required by the device even if the number of dispatches is increased to some extent. Accordingly, no particular performance concern is raised by the read processing of the scenario sequence file.

Furthermore, commands described in the scenario sequence file include the contents and the order of the functions called, but each function is integrated into components. Accordingly, a set of functions can be described as a macro program to enhance usability.

The speed of read processing of the scenario sequence file mainly relates to the time required for the dispatch of functions called from the scenario sequence file. A macro where a lot of commands are incorporated achieves quick processing, but impairs the versatility and thus causes the difficulties in use. To the contrary, when a frequently used command, such as "memory transfer", is used, the number of the dispatches is increased. If a processor whose processing capability is low is used, it may fall into errors without completing the recognition of the device within the time required by the device and thus attention is required. Consequently, the macro should be designed appropriately, considering the number of the dispatches permitted from processing capability, etc. of the processor, and the versatility of the scenario sequence file.

Typically, processing of protocol packets, etc. can be macro-sequenced easily, but it is considered rather inefficient to macro-sequence some of the processing, such as processing, which is bus-connected and includes a plurality of interruption processing. In many case, the processing specified as a macro in easy-to-use unit enhances a usability of the scenario sequence file.

Figure 2:
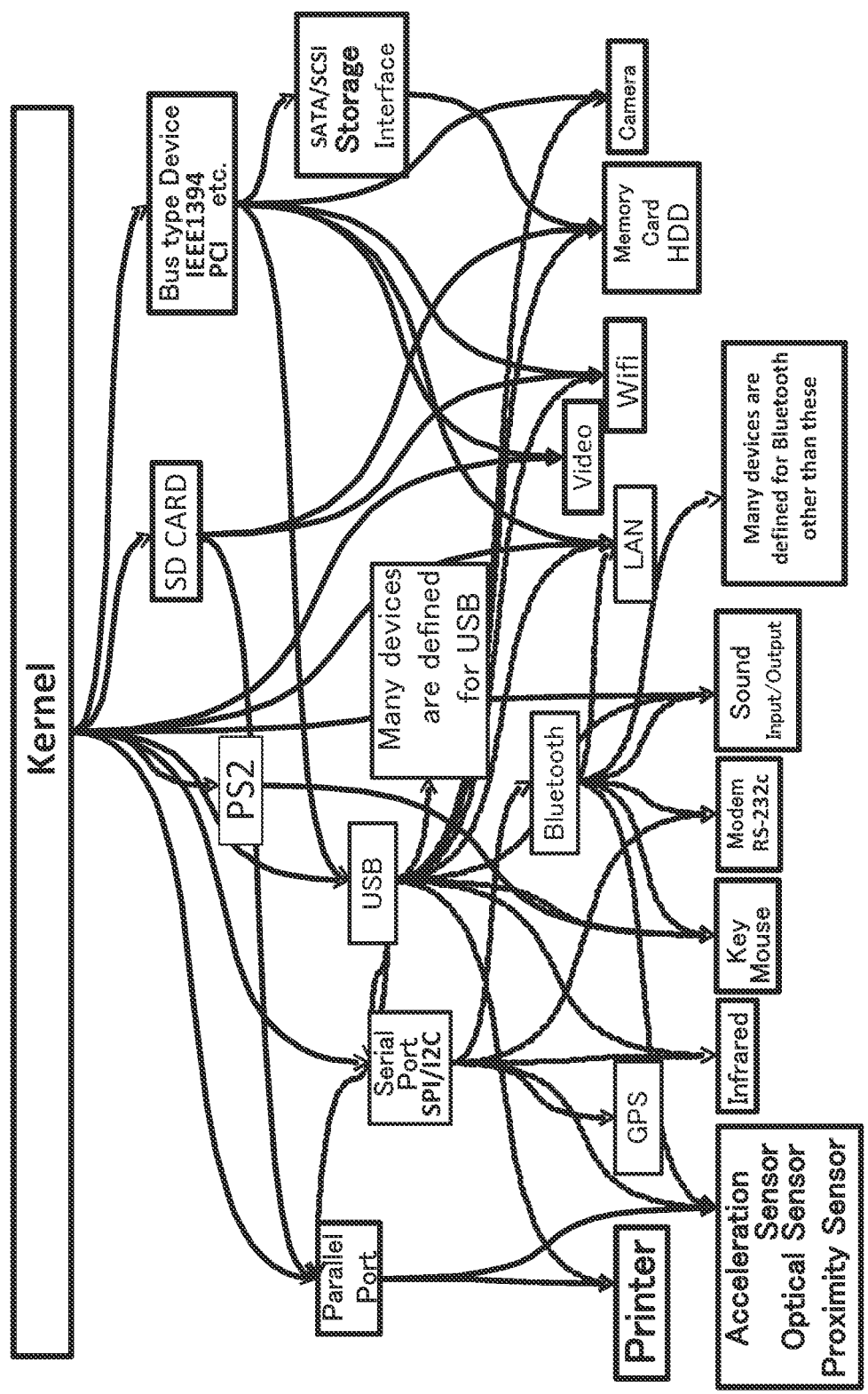
FIG. 2 is a chart showing a physical or logical connection condition between the kernel and devices, and the physical or logical connection condition between devices.

FIG. 2 is a chart showing a physical or logical connection condition between the kernel and devices, and the physical or logical connection between devices. In the chart, the solid lines represent physical bus interface connections and the dashed lines represent logical interface connections. For example, the kernel and USB host controller are bus-connected, but the USB device connected to USB host controller is connected via a logical interface communicated by protocol packet. For example, FIG. 2 represents that SD host device is connected to the kernel via an external bus, such as PCI bus, and, at the further end of SD host device, wireless communication devices, such as WiFi (wireless LAN) module, or memory card, etc. can be connected via the external bus called "SD bus (or SDIO bus maintaining backward compatibility)".

As described above, the notification driver is loaded into the kernel, and then, the device registration method to the kernel (the device setting-information) is provided to the kernel during the initialization of the device. Consequently, whatever device-interface the device includes, the device-driver corresponding to the device can be provided.

Additionally, in a configuration where the OS kernel informs device-proxies, which is situated at the lower-stage, of this "scenario sequence file" (more precisely, information relating to a device actually connected), the device-proxies can be connected in multiple stages again and again in theory. When a multicore processor is used, the threads are detached and shared by inter-processor communication, and can be informed to the lower stage via a logical interface using a communication path or a communications protocol.

(Second Embodiment)—Registration Method of Device-Driver

Figure 3:
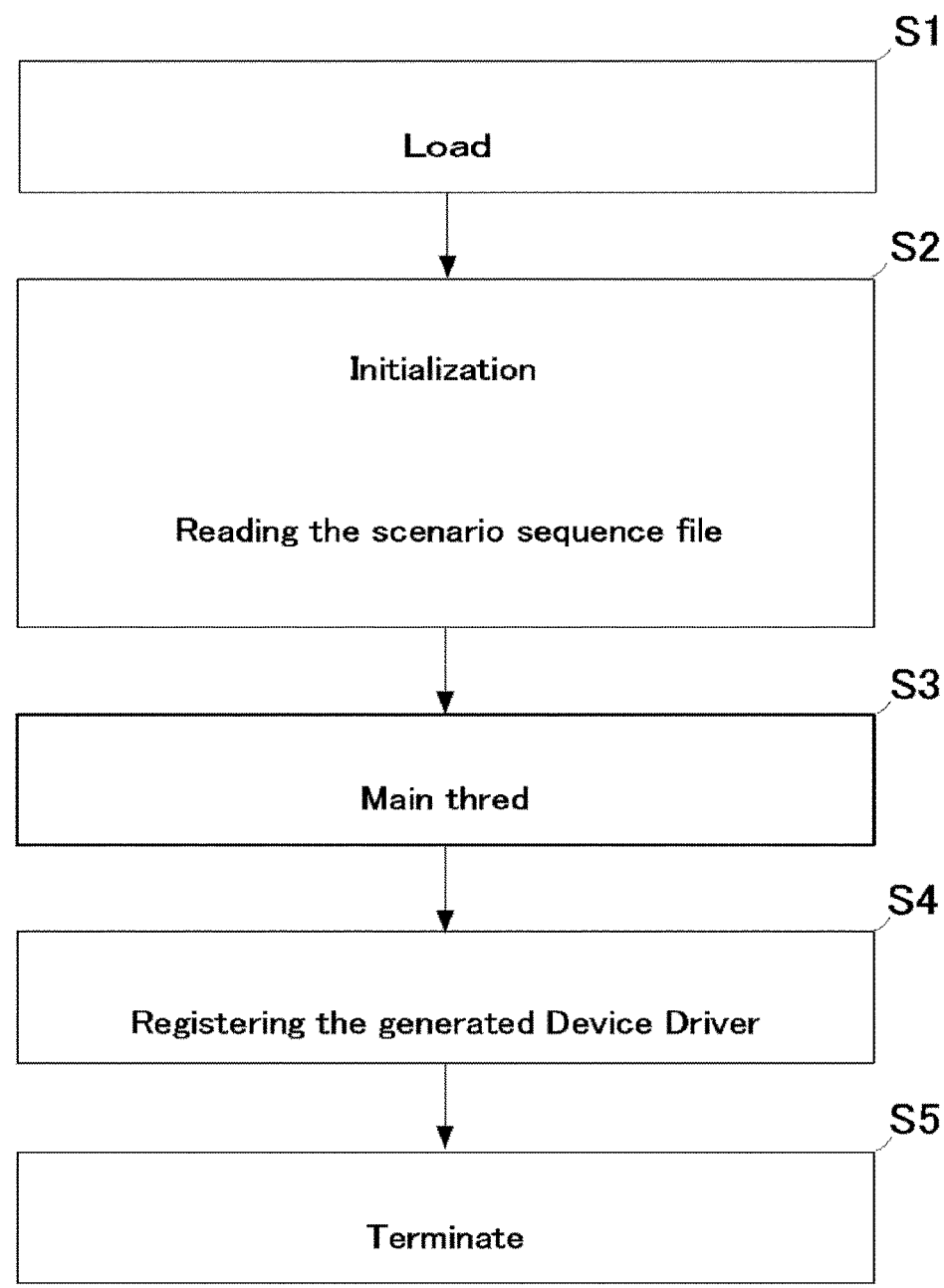
FIG. 3 is a flow chart showing a registration method of the device-driver.

FIG. 3 is a flow chart showing a registration method of a device-driver in the Second Embodiment.
—Step S1—
In Step S1, the notification driver described in the First Embodiment is loaded into the kernel. The method for loading the device-driver after OS-boot is OS-dependent. For example, when the OS is Linux®, a command "insmod", etc. may be used. When the OS is Windows®, a method for registering required device configuration information to the registry, by creating a driver definition file called ".sys", and making the OS read the device-driver in a plug-and-play, is simple. If other OS has any commands for loading the device-driver into the kernel, those commands may be used.
—Step S2—
In Step S1, loading the notification driver is completed and the device is in standby state. Subsequently, the initialization of the device is started (Step S2), and the scenario sequence file is read in.

Specifically, examples of this initialization step include setting the device's configuration information (parameter) to an initial value, initializing the execution commands described in the execution script that determines a device's operation, and securing operation areas on a memory for preparing for generating the device-driver based on the scenario sequence file.

For this initialization step, the following are examples of each operation for both the device and the kernel, in particular.

S2-1. Setting Default Values of the Register <OUT Side (Device Side)>

The registers of a sensor on OUT side are set to initial values. If the device is a camera module, various device parameters, such as a screen size for a camera, point where the focusing is started from (generally co), white balance (image tone), and exposure time, are set to initial values. The camera module is just an example, and it means that the setting values of various devices are set to initial values.

S2-2. Clearing the Work Memory (Work Memory is Zero-Padded) <IN Side>

The above step constantly assures the same operation if the device-driver is registered into the kernel.

The initialization is completed by reading the scenario sequence file.
—Step S3—
Subsequently, a main thread is executed (Step S3) where a handler is generated based on the scenario sequence file. This Step S3 includes steps for generating functions and sequences for read, write, and I/O control and can be executed with user rights. For example, it means that the user can change a writing attribute in a file using I/O control. These steps determine an operation of the device-driver.
—Step S4—
Subsequently, a device-driver is registered in the kernel using the above each handler generated (Step S4). This device-driver requires just to be registered in an available state in the OS, and just to be included in the OS kernel irrespective of the method or utility form, etc.

Accordingly, the notification driver cannot start functioning as a device-driver, simply by loading the notification driver into the kernel. (Step S1). At least one handler is generated by initialization of the device and reading of the scenario sequence file, each handler is registered in the kernel (Step S4), and then notification driver finally starts functioning as a device-driver for the first time. Needless to say, the operation of a device-driver according to the embodiments is the same as the operation of a conventional device-driver when observed from the device-side.

In the above Steps S1 to S4, a computer system can generate a device-driver 10 not dependent on the OS by reading device configuration information described in the scenario sequence file (the execution script that determines a device parameter and a device operation), and then the device connected to an interface can be controlled and used by using the device driver 10. Since the device-driver 10 does not require to be compiled (the conventional device-driver requires to be compiled), the device-driver 10 can be generated easily.

Step S5
When the device is removed, the programs, which are operating on the kernel, are terminated.

Third Embodiment

Figure 4A:
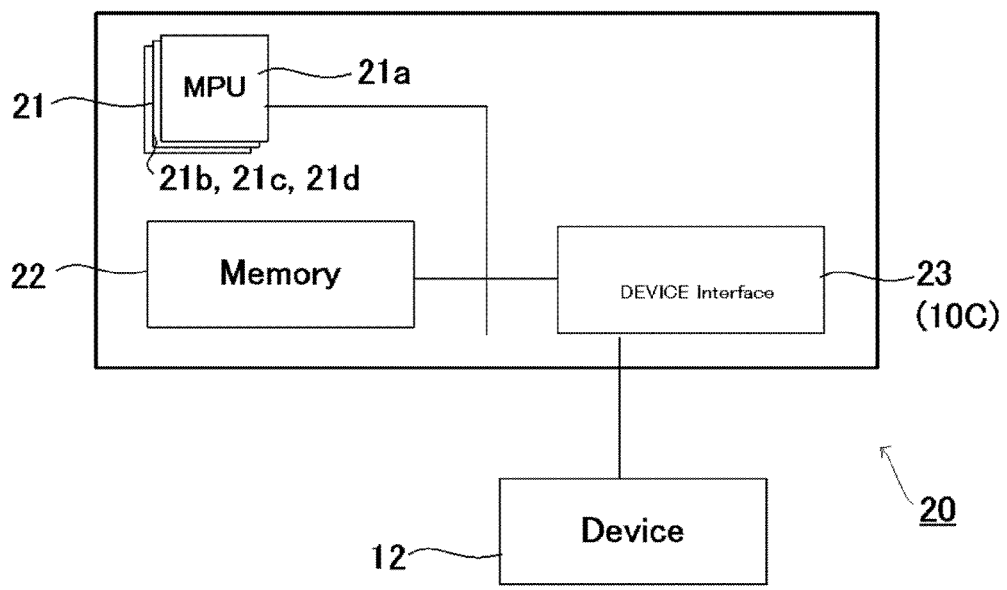
FIG. 4A is a schematic diagram showing a basic configuration of a computer in a housing including a multicore processor unit.
Figure 4B:
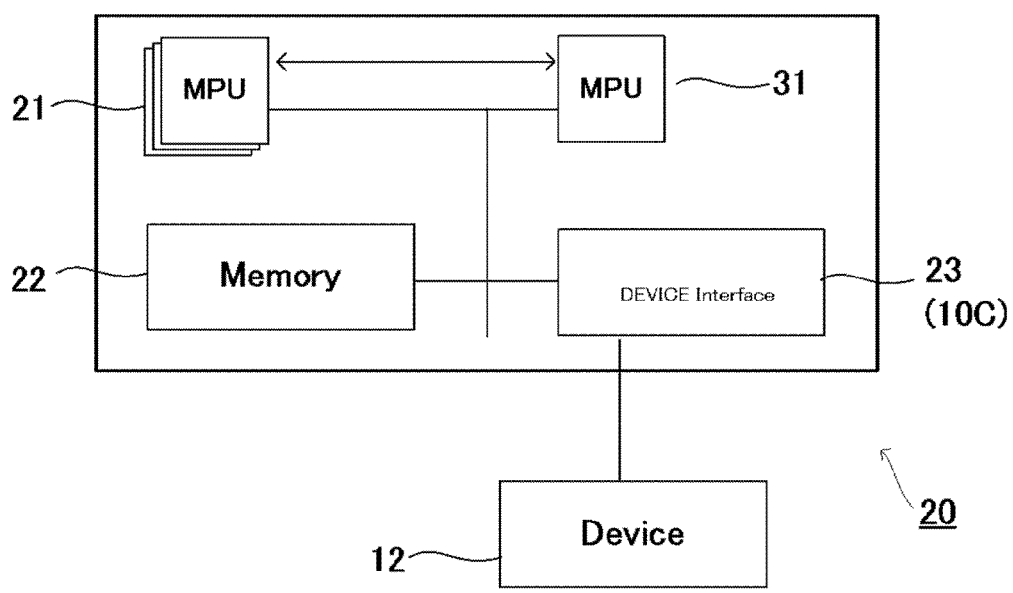
FIG. 4B is a schematic diagram showing a basic configuration of a computer in the same housing as that in FIG. 4A including two processors.

FIG. 4A is a schematic diagram showing a basic configuration of a computer in a housing including a multicore processor unit, and FIG. 4B is a schematic diagram showing a basic configuration of a computer in the same housing as that in FIG. 4A including two processors. A computer 20 includes a multicore processor microprocessor unit (MPU) 21, a memory 22, and a device-interface 23 (10C in FIG. 1). The microprocessor unit 21 is mostly used for CPU (Central Processing Unit), and various logic ICs, such as FPGA (field-programmable gate array) and a microcomputer, may also be used. The memory 22 refers to a temporary storage, such as RAM (Random Access Memory).

FIG. 4A shows an embodiment that the multicore microprocessor unit consists of a plurality of processor cores (21a, 21b, ... ), one processor core 21a is allocated to the behavior of the device-proxy, and other processor cores are allocated to the OS. The computer 20 includes a multicore processor microprocessor unit (MPU) 21, a memory 22, and a device-interface 23, and is connected to the device 12 via the device-interface 23. At this time, the scenario sequence file is shared among the processor cores allocated to the OS by an inter-processor communication.

Figure 5:
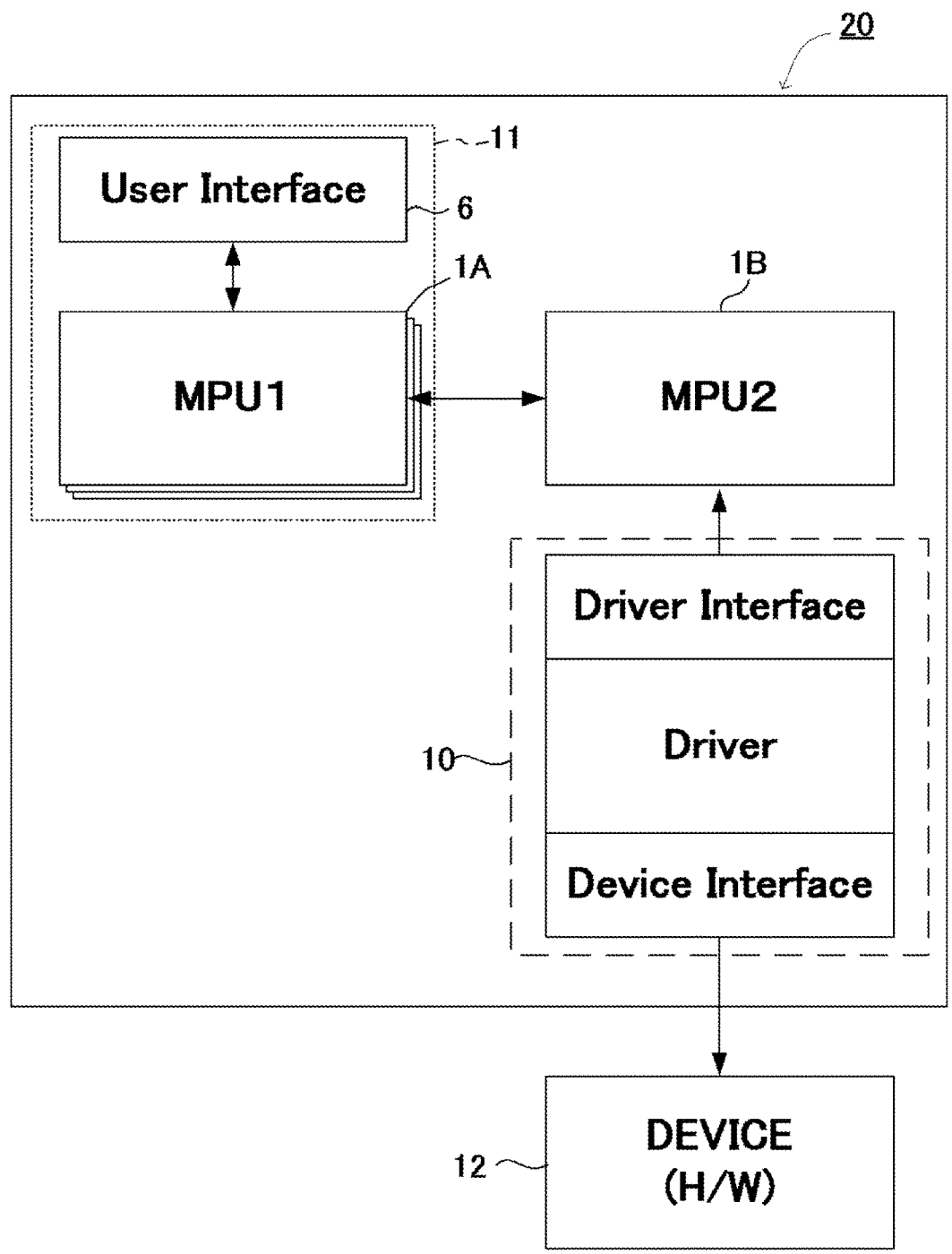
FIG. 5 is a schematic diagram showing a whole configuration that the device-proxy is connected to a computer.

FIG. 5 is a configuration diagram illustrating FIG. 4a in more detail. FIG. 5 shows that the operating system kernel managing a user interface can detach threads between processors 1A (21b, 21c, ... in FIG. 4A) and a processor 1B managing the device-proxy inside the computer 20, and that data can be shared by an inter-processor communication. The device-proxy receives the scenario sequence file and connects the device 12 via a device-driver 10.

FIG. 4B is a diagram showing an embodiment wherein the CPUs are physically detached. In this case, the CPUs cannot use the inter-processor communication, but they are typically bus-connected if they are in the same housing (on a circuit board), and thus the scenario sequence file can be shared by bus-connection.

Figure 6:
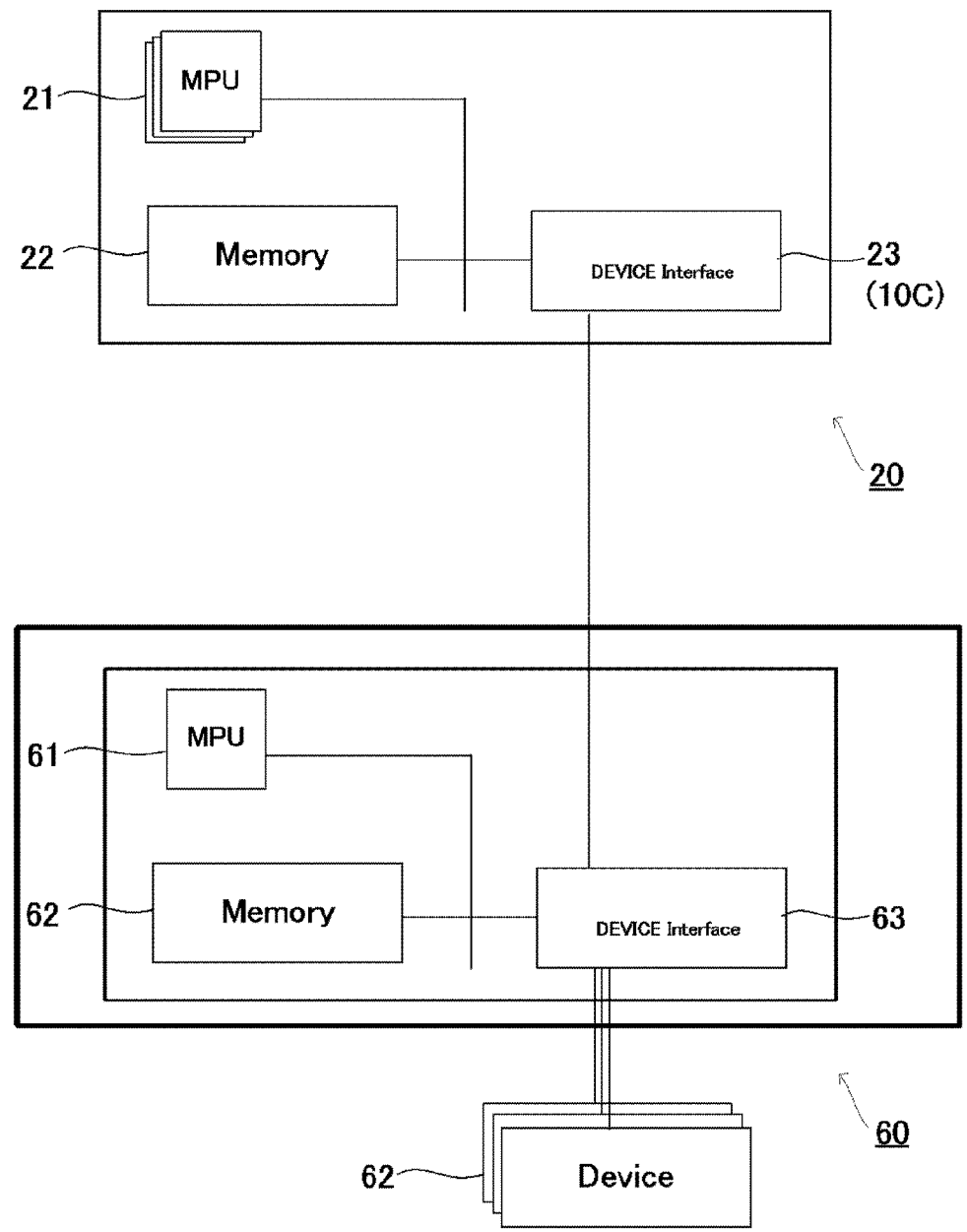
FIG. 6 is a schematic diagram showing an embodiment that the device-proxy is connected as an independent hardware from the OS.

FIG. 6 is a schematic diagram showing an embodiment wherein the device-proxy 60 is connected to the computer 20 as an independent hardware via a device-interface 23 (in particular, logical interface), when observed from the OS side. The device-proxy 60 includes a processor 61, a memory 62, and a device-interface 63, and is connected to one or a plurality of devices 62. The number of the processor cores is at least one or more.

The device-interface 23 and 63 may be any one for peripheral equipment, which the microprocessor unit 21 controls, or more specifically, any one which can connect to the various devices as shown in FIG. 2. Examples of the device-interface 23 and 63 include a PCI (Peripheral Component Interconnect) card, a network card, a microphone, a camera, a USB, an SD card, a device incorporating WiFi (Wireless Fidelity), ADC (Analog to Digital Converter), a device incorporating Bluetooth®, a device incorporating GPS, a printer, FAX, and a scanner. The device-interface 23 may be any interface for connecting a temporal storage device (memory 22, etc.) or a storage device (hard disk, etc.), or may be an input interface for connecting a keyboard, a mouse, or a joystick, or an output interface for connecting a display device, such as a display. Additionally, since the memory 22 may also be peripheral equipment, for example, the memory 22 is connected to a memory slot (a device-interface (not shown)) and the microprocessor unit 21 manages the memory 22 by using a device-driver for memory 22.

The operating system is installed in the computer 20, and additionally, the device-driver 10 generated by the above Steps S1 to S5 is registered in the OS kernel. The device 12 is then connected downstream of the device-interface 23 of the computer 20.

The driver-interface 10A shown in FIG. 1 is configured by each handler for the OS. The driver 10 plays the role of transmitting and receiving data between the driver-interface 10A (each handler) and the device-interface 10C (determined for each device). In particular, the driver 10 (10B) is a program for processing each handler. The processing of each handler has been determined in the above Step S3.

The above device-driver 10 is generated based on the scenario sequence file, so that the computer 20 can transmit and receive communication data to/from the device 12.

(Examples)—Specific Example of the Scenario Sequence File

The following is an example of the scenario sequence file where the device configuration information is described.

Since the scenario sequence file is a file where an execution script for generating a device parameter and a handler of a device connected with the device-interface is described, and the scenario sequence file is a script format file, the scenario sequence file may be constituted of text data having such a very small-sized file (for example 2 byte or less) to be editable with editors. By means of implementation, it can be described in an intermediate language format, such as JavaScript® and XML, not depending on the OS or hardware (MPU) in a computer.

Information required to register the device into the kernel is:

(a) information about the device-interface;
(b) information about operation content of the device; and
(c) information about the device of connection destination.

This information should be described in the scenario sequence file, and registered into the kernel via the notification driver.

Even if minor change occurs in the configuration information of the device, the source code of the device-driver need be neither rewritten nor recompiled again unlike the conventional manner. It is only necessary to rewrite a part of the scenario sequence file and initialize the device again.

Some devices, such as a printer, can accept a plurality of kinds of connection forms. If the printer connectable to a network can be connected with a USB connection or a serial connection, the configurations of the driver-interface and the device-driver body are the same but only the driver-interface is different. Once the topologies are determined, then they will not be changed since then. Consequently the device-interface to be implemented may be just determined before the implementation. If it is desired to change the topology from a USB connection to a network connection (such as an Ethernet® connection), while the OS is started and the device-driver is not closed as well, the device is initialized again and the scenario sequence file whose device-interface is altered to indicate that the path information has been changed is required to just be read in via the notification driver.

Examples of the device configuration information (command and parameter, etc.) defined in the scenario sequence file include Processing Instruction Definitions (described below), Data Set Definitions (described below), and the like.

[Processing Instruction Definition]

As is described below, a Processing Instruction Definition may define one or more scenarios and one or more corresponding execution commands to be executed in event of the defined scenario. Additionally, an a pre-determined, device-dependent interruption number may be processed as a reserved word, such as "int1".

Processing Instruction: Processing Content wait intr(n): Wait for an interruption of interruption ID n.

write $addr: Write the data received from the OS into $addr write $addr,size: Write the data received from the OS from $addr write data,$addr: Write the data into $addr read $addr,size: Return the data containing only "size" from $addr to the OS copy $add1,$add2,size: Transfer "size" byte data from $add1 to $add2 copy $add1,$add2,size: Transfer "size" byte data from $add1 to $add2 copy #dataset(n): Transfer Data set ID n res data: Return the data to the OS and mask,$addr: AND data in $addr and "mask", and Reflect it to a conditional branch expression or mask,$addr: OR data in $addr and "mask", and Reflect it to a conditional branch expression if else endif: a condition branch of the scenario while endwhile: Execute repeatedly from "while" to "endwhile" until some condition occurs for n endfor: Execute from "for" to "endfor" n times exit: Terminate the interface In addition to those mentioned above, other processing instructions, such as a synchronism mechanism including DMA transfer or "mutex", etc., may also be described in the Processing Instruction Definition.

[Data Set Definition]

As is described below, a Data Set Definition may define one or more data sets. A data set may be defined by a data column having freely-selected name. A data column may identify a register and describe some type of definition content, such as the timing after writing to the identified register or the like.

Data Set Definition: Definition Content b $addr and mask n: Define a data set b as a data column "Write AND of "mask" into the content of $addr by one-byte, and Wait for n milliseconds"

w $addr or mask n: Define a data set w as a data column "Write OR of "mask" into the content of $addr by two-byte, and Wait for n milliseconds"

l $addr data n: Define a data set 1 as a data column "Write "data" into the content of $addr by four-byte, and Wait for n milliseconds"

Subsequently, the following is an example of the device-driver that assigns the execution script including device parameters, processing instruction definitions, and data set definitions to each handler of the OS ([init], [term], [open], [close], [I/O-ctrl], [read], [write], [main_thread]) based on the scenario sequence file, and that constitutes the processing of each handler. Using this device-driver allows controlling reading/writing of an acceleration sensor from/into the memory mapped register. The acceleration sensor is an example of a device that transmits and receives predetermined-sized packets at arbitrary timing. "//" indicates comments in some of the following.

```
[init]
    allocate $buffer 16;
    allocate $flag 1;
    exit;
[term]
    free buffer;
    free $flag;
    exit;
```

-continued

```
[open] // Do Nothing
    exit;
[close] // Do Nothing
    exit;
[I/O-ctrl] // Do Nothing
    exit;
[read]
    or.w #0001,$flag;
    if // If Buffer includes any Data
    read $recive_data,16; // Read Data
    write.w 1,$flag
    endif
    exit;
[write]
    write $send_reg,16; // Start reading Device
    wait int1; // Wait for Completion Interruption
    exit;
[main_thread] // Wait for Reception Interruption and Write into Buffer
    while;
    wait int1; // Wait for Completion Interruption
    read $recive_data,buffer,16; // Write Data into Buffer from Device
    write.w 1,$flag;
    endwhile;
```

The instructions above describe a relatively simple program. The scenario (order of the instruction) is described in the scenario sequence file with a text editor, and the processing content described (for example, one having a look-up table) is allocated as a callback handler to each interface (six types) by parsing the scenario, so that the function as a device-driver is determined. Ways to read the scenario sequence file include using some functions, such as "Open", "Read", "Write", and "Close". If an interruption occurs, "Interruption Waiting" is executed.

If a third party, such as a user who is not the device maker, creates (or changes) a scenario sequence file by acquiring parameters required for setting device, the change of the scenario script content itself may cause a malfunction of the driver operation. Consequently, in this case, some measures can be taken to prevent the changing of settings unnecessarily, for example by making users create and change the scenario sequence file with an application tool other than the text editor.

Fourth Embodiment

Figure 7A:
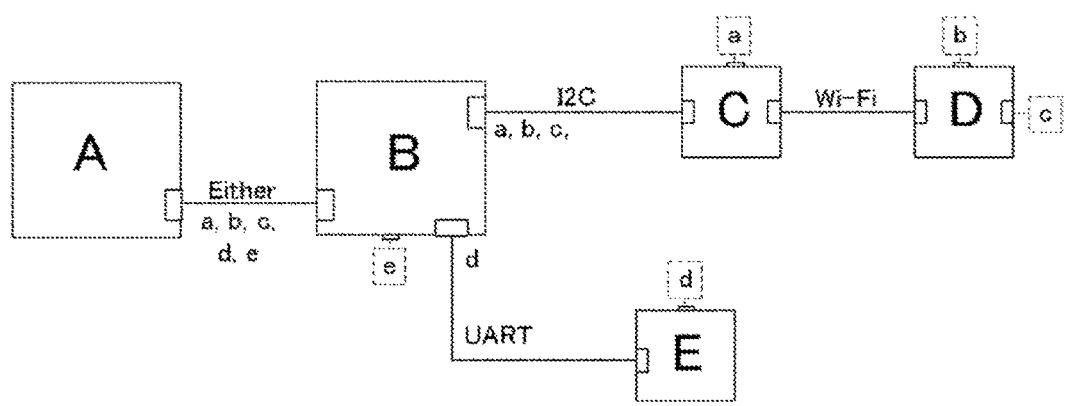
FIG. 7A is a schematic diagram showing a hardware configuration of a computer system.
Figure 7B:
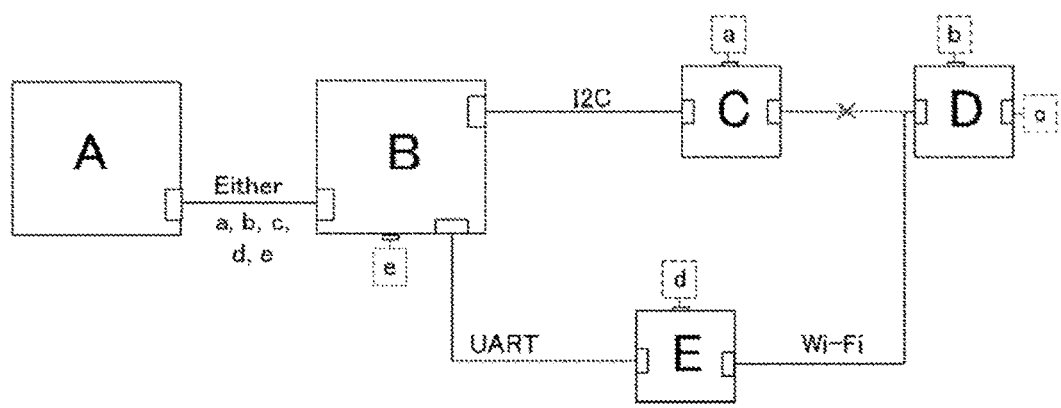
FIG. 7B is a schematic diagram showing a hardware configuration of a computer system.

Both of FIG. 7A and FIG. 7B are schematic diagrams showing hardware configurations of a computer system. A computer A drives the OS and mostly executes programs that require a high calculation processing capability. However, the computer A does not directly receive events from various devices a-e, such as interrupts, that would otherwise interrupt the calculations being performed by the computer A because an abstracted device-proxy B controls the various devices, either directly (device e) or via device proxies B-E. Each of device-proxies B-E is a device-proxy where an embedded operating system is mounted, and each device-proxy B, C, D, E is respectively connected to various devices e, a, b and c, and d. Various devices a-e may include devices such as an input device, an acoustic device, a storage device (hard disk, etc.), and a network device. According to embodiments of the present invention, the lower the stage of a processor in the device-proxy is, the lower the speed of the processor used is. Examples of a processor that may be used for the relatively higher stage device-proxy B include an inexpensive 16-bit microcomputer (100 MHz), and examples of the processor used for the relatively lower stage device-proxies C, D, and E include a further inexpensive 16-bit microcomputer (20 MHz). Alternatively, if the computer A includes a multicore microprocessor unit, one of the multicore may function as a processor core for the device-proxy B.

The computer A holds the scenario sequence file including all the device configuration information required for operating the various devices a-e. In an embodiment where a single scenario sequence file holds device configuration information for a single device, five scenario sequence files will be provided for five devices. However, device configuration information for operating a plurality of devices may be put together into one scenario sequence file, depending on the design.

Each device-proxy B to E may respectively receive the scenario sequence file via the device-interface from the input side (upper stage). The required data is read from the scenario sequence file according to a communication path or a communications protocol is described based on information of various interfaces, such as I2C, SPI, Wi-Fi, and UART, and then the device is set. Alternatively, the device-proxy holds data where the device configuration information for the connected device is described, without receiving the scenario sequence file from the upper stage.

Since a logical packet is continuous streaming data, "symbol" showing a device name of a control target is represented in data format, e.g. data format of 8-byte ASCII character, the required information can be described in the header of the logical packet, and the data can be transmitted. In experimentation, the logical packet data may be configured in a "size symbol variable-length data" data column format.

As described above, while the scenario sequence file is shared, processing for devices is detached from processing of a computer, the device-proxy is made to control the devices, and it can reduce processing load on the CPU. Even if a connection condition of the devices in FIG. 7A is changed into that in FIG. 7B, the devices connected to the computer have been abstracted on the computer side. Consequently, whatever the devices situated at the lower stage are, and as long as required data can be received within a time period that an application program requests, the scenario sequence file remains the same, and nothing affects the operation. Furthermore, when a device including content (e.g. hard disk) is connected, the device-proxy itself does not hold any information. Accordingly, data encryption by the computer will eliminate a risk of information leakage when the hard disk is taken away, etc. Such a system is effective for a terminal that manages sensitive information, such as an automatic teller machine (ATM) of a bank.

REFERENCE SIGNS LIST 10 device-driver
10A driver-interface
10B device body
10C device-interface
11 kernel
12 device
21 multicore microprocessor unit (MPU)
22 memory
23 device-interface (physical interface and/or the logical interface)
31, 61 processor (single-core or multi-core)
62 memory
63 device-interface
A computer
B, C, D, E device-proxy
a, b, c, d, e device

The invention claimed is:

1. A device-proxy comprising:
a multicore microprocessor unit having a first processor and a second processor, the multicore microprocessor unit being configured to separately execute execution threads on the first and second processors, and the multicore microprocessor unit being capable of inter-processor communication;
a storage means for storing a scenario sequence file where only device configuration information not depending on an operating system is described; and
a device-interface,
wherein:
  the first processor drives a first operating system,
  the second processor controls a device connected to the device-interface,
  the device configuration information is shared between the first processor and the second processor by the inter-processor communication,
  while the device configuration information is shared between the first processor and the second processor, a driver-interface, which does not include any device configuration information at all, for notifying a kernel of the first operating system of the device configuration information is loaded into the kernel, and the scenario sequence file is read into the kernel via the driver-interface, and
  wherein the driver-interface is only a part of a device driver, and wherein, after the device is initialized and the scenario sequence file is read into the kernel via the driver-interface, at least one handler is generated and registered in the kernel, and the driver-interface begins to function as a device driver.

2. A device-proxy comprising:
a first processor;
a second processor;
a storage means for storing a scenario sequence file where only device configuration information not depending on an operating system is described; and
a device-interface,
wherein:
  the first processor drives a first operating system,
  the second processor controls a device connected to the device-interface, and
  while the first processor is driving the first operating system and the second processor is controlling the device connected to the device-interface:
    the device configuration information is from shared between the first processor and the second processor by bus connection,
    a driver-interface, which does not include any device configuration information at all, for notifying a kernel of the operating system of the device configuration information is loaded into the kernel, and
    the scenario sequence file is read into the kernel via the driver-interface,
  wherein the driver-interface is only a part of a device driver, and wherein, after the device is initialized and the scenario sequence file is read into the kernel via the driver-interface, at least one handler is generated and registered in the kernel, and the driver-interface begins to function as a device driver.

3. A device-proxy connected to a computer, the computer comprising:
a first processor driving an operating system;
a storage means for storing a scenario sequence file where only device configuration information not depending on an operating system is described; and
a first device-interface, and
wherein the device-proxy is connected to the computer via the first device-interface, and
the device proxy comprising a second processor and a second device-interface, and
wherein the second processor controls a device connected to the second device-interface,
wherein, while the device configuration information is shared between the first processor and the second processor via the first device-interface, a driver-interface, which does not include any device configuration information at all, for notifying a kernel of the operating system of the device configuration information is loaded into the kernel and the scenario sequence file is read into the kernel via the driver-interface,
wherein the driver-interface is only a part of a device driver, and wherein, after the device is initialized and the scenario sequence file is read into the kernel via the driver-interface, at least one handler is generated and registered in the kernel, and the driver-interface begins to function as a device driver.

4. A control method of a device-proxy, the device-proxy comprising:
a multicore microprocessor unit having a first processor and a second processor, the multicore processor unit being configured to separately execute execution threads on the first and second processor, and the multicore microprocessor unit being capable of inter-processor communication;
a storage means for storing a scenario sequence file where device configuration information not depending on an operating system is described; and
a device-interface, and
the control method of the device-proxy comprising the steps of:
while threads of the microprocessor unit are separated,
driving a first operating system by the first processor, and controlling a device connected to the device-interface by the second processor, and
while the device configuration information is shared between the first processor and the second processor by the inter-processor communication,
loading a driver-interface, which does not include any device configuration information at all, for notifying a kernel of the first operating system of the device configuration information, into the kernel and
reading the scenario sequence file into the kernel via the driver-interface,
wherein the driver-interface is only a part of a device driver, and wherein, after the device is initialized and the scenario sequence file is read into the kernel via the driver-interface, at least one handler is generated and registered in the kernel, and the driver-interface begins to function as a device driver.

5. A control method of a device-proxy, the device-proxy comprising:
a first processor;
a second processor;
a storage means for storing a scenario sequence file where only device configuration information not depending on an operating system is described; and
a device-interface, and
the control method of the device-proxy comprising the steps of:
driving a first operating system by the first processor, and controlling a device connected to the device-interface by the second processor, and
while the device configuration information is shared between the first processor and the second processor by bus connection,
loading a driver-interface, which does not include any device configuration information at all, for notifying a kernel of the operating system of the configuration information, into the kernel and
reading the scenario sequence file into the kernel via the driver-interface,
wherein the driver-interface is only a part of a device driver, and wherein, after the device is initialized and the scenario sequence file is read into the kernel via the driver-interface, at least one handler is generated and registered in the kernel, and the driver-interface begins to function as a device driver.

6. A control method of a device-proxy, the device-proxy connected to a computer, the computer comprising:
a first processor driving an operating system;
a storage means for storing a scenario sequence file where only device configuration information not depending on an operating system is described; and
a first device-interface; and
wherein the device-proxy is connected to the computer via the first device-interface, and
the device-proxy comprising a second processor and a second device-interface, and
the control method of the device-proxy comprising the steps of:
controlling a device connected to the second device-interface by the second processor, and
while the device configuration information is shared between the first processor and the second processor via the first device-interface,
loading a driver-interface, which does not include any device configuration information at all, for notifying a kernel of the operating system, of the configuration information, into the kernel and
reading the scenario sequence file into the kernel via the driver-interface,
wherein the driver-interface is only a part of a device driver, and wherein, after the device is initialized and the scenario sequence file is read into the kernel via the driver-interface, at least one handler is generated and registered in the kernel, and the driver-interface begins to function as a device driver.

7. A device-proxy being logically interposed between an operating system kernel, which is operating on a computer, and one or more devices, and acting as a proxy for the devices, comprising:
a functionality as a device-interface required for operating both of the device-proxy itself and the devices connected to a lower stage of the device-proxy; and
a communication functionality for exchanging information required for the devices' operation with the operating system,
wherein, while the operating system holds device configuration information which is described in a form not depending on the operating system,
the device-proxy receives the device configuration information from the operating system by the communication functionality, a driver-interface, which does not include any device configuration information at all, is loaded, and a device-driver is generated and registered into the operating system kernel via the driver-interface for notifying the operating system kernel of the device configuration information, wherein the driver-interface is only a part of a device driver, and wherein, after the device is initialized and the device configuration information is read into the driver-interface, at least one handler is generated and registered in the operating system kernel, and the driver-interface begins to function as a device driver.

8. The device-proxy according to claim 7, wherein the device configuration information consists of parameters depending on only the devices and commands not depending on the operating system, and is described in a scenario sequence file showing processing procedures.

9. The device-proxy according to claim 8, further comprising receiving the device configuration information when at least one of the following is true:

a first device of the devices is connected to the device-proxy;

the device configuration information required can be received within a time period that an application program running on the operating system requests; and an interruption event or other processing request is issued from the first device.

10. The device-proxy according to claim 7, further comprising receiving the device configuration information when at least one of the following is true:

a first device of the devices is connected to the device-proxy;

the device configuration information required can be received within a time period that an application program running on the operating system requests; and an interruption event or other processing request is issued from the first device.

11. A computer system connected with a device-proxy, the device-proxy being connectable to one or more devices, wherein the computer system executes an operating system;

wherein the device-proxy comprises:

functionality as a device-interface required for operating both the device-proxy itself and the devices; and a communication functionality for exchanging information required for the devices' operation with the operating system, wherein the device-proxy is connected with the computer system via the communication functionality;

wherein the device-proxy is logically interposed between the operating system and the devices, and is acting as a proxy for the devices; and wherein, while the operating system holds device configuration information which is described in a form not depending on the operating system, the device-proxy receives the device configuration information from the operating system by the communication functionality, and a driver-interface, which does not include any device configuration information at all, is loaded, and a device-driver is generated and registered into a kernel of the operating system via the driver-interface for notifying the operating system kernel of the device configuration information, wherein the driver-interface is only a part of a device driver, and wherein, after the device is initialized and the device configuration information is read into the driver-interface, at least one handler is generated and registered in the kernel, and the driver-interface begins to function as a device driver.

12. The computer system according to claim 11, wherein the communication functionality is achieved by an inter-processor communication or communicating via a device-interface.

13. The computer system according to claim 11, wherein other device-proxies are connected in multiple stages, in series and/or parallel to the device-proxy, and wherein any device configuration information for each device-proxy and for one or more devices connected to each device-proxy is described in a form not depending on the operating system of the computer system, and the device configuration information is held in the computer system or any one of the device-proxies.

14. The computer system according to claim 13, wherein at least one of the device-proxies does not include the operating system.

15. The computer system according to claim 13, comprising a configuration where a plurality of device-proxies are connected in multiple stages and in series, wherein the lower the stage of the device-proxy is, the lower a speed of the processor used in the device-proxy is.

16. The computer system according to claim 13, wherein when a logical packet is transmitted to the operating system from the device connected to the device-proxy, the device-proxy describes required information, such as a size, a symbol showing a device name of a control target, and an option, that is variable-length data, in header of the logical packet, and the information is transmitted to the operating system.

17. The computer system according to claim 11, wherein, while at least one of processor units in the computer system, which mounts a multicore processor unit, is assigned to operate the device-proxy and not to operate the operating system, and other processor units are assigned to operate the operating system.

* * * * *